(12) United States Patent
Hiramatsu et al.

(10) Patent No.: US 7,424,536 B2
(45) Date of Patent: Sep. 9, 2008

(54) COMPUTER SYSTEM AND BANDWIDTH CONTROL METHOD FOR THE SAME

(75) Inventors: Masami Hiramatsu, Yokohama (JP); Satoshi Oshima, Tachikawa (JP); Yutaka Enko, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 10/964,681

(22) Filed: Oct. 15, 2004

(65) Prior Publication Data
US 2006/0080457 A1    Apr. 13, 2006

(30) Foreign Application Priority Data
Aug. 30, 2004    (JP)    ............... 2004-249430

(51) Int. Cl.
*G06F 15/173* (2006.01)
(52) U.S. Cl. .................................... 709/226
(58) Field of Classification Search ............ 709/226
See application file for complete search history.

(56) References Cited
U.S. PATENT DOCUMENTS
7,032,025 B2 *  4/2006  Boys ................... 709/227
2005/0071471 A1 *  3/2005  Saenz, III ............ 709/226

FOREIGN PATENT DOCUMENTS
JP    2003-345709    12/2003

* cited by examiner

*Primary Examiner*—Jason Cardone
*Assistant Examiner*—Chirag R Patel
(74) *Attorney, Agent, or Firm*—Mattingly, Stanger, Malur & Brundidge, P.C.

(57) ABSTRACT

A computer system is structured, including a plurality of computers sharing a storage apparatus. The computers each include a control section for determining an access priority based on an attribute of a client computer forwarding an access request. In the control section, the result derived by adding up the priorities is compared with the total value of the priorities calculated by other computers for assignment of an input/output bandwidth. In accordance with the priority assignment, access execution is performed in order of priority. With such a structure, access congestions can be favorably avoided through efficient bandwidth control, and bandwidth assignment can be performed on a server basis in accordance with processes executed by the client computers.

17 Claims, 10 Drawing Sheets

PRIORITY DECISION TABLE 30

| IP ADDRESS | OPERATION | TARGET FILE | PRIORITY |
|---|---|---|---|
| 192.168.1.2 | .. | .. | 1 |
| 192.168.1.4 | .. | .. | 1 |
| 192.168.1.5 | read | .. | 1 |
| 192.168.1.5 | write | .. | 5 |
| 192.168.1.7 | read | /var/db/data | 4 |
| 192.168.1.* | read | /vat/tmp/work* | 5 |
| .. | .. | /home/work/* | 2 |
| .. | write | .. | 4 |
| .. | .. | .. | 3 |

ACCUMULATED PRIORITY LIST

| IP ADDRESS | ACCUMULATED PRIORITY | |
|---|---|---|
| 192.168.2.1 | 25 | 341 |
| 192.168.2.2 | 40 | 342 |
| ... | ... | |
| 192.168.2.n | 10 | 34n |

COMPUTER SYSTEM AND BANDWIDTH CONTROL METHOD FOR THE SAME

CROSS-REFERENCES TO RELATED APPLICATIONS

This application relates to and claims priority from Japanese Patent Application No. 2004-249430, filed on Aug. 30, 2004, the entire disclosure of which is incorporated herein by reference.

BACKGROUND OF THE INVENTION

The present invention relates to a computer system and a bandwidth control method for the computer system and, more specifically, to a bandwidth control method for use among computers and a computer-sharing storage apparatus all provided in a computer system.

A computer system includes a computer (hereinafter, referred to as "server" or "server computer") that offers file service to a plurality of computers (hereinafter, "clients" or "client computers"). The file service specifically denotes transmission or storage of data in a file format. In such a computer system, the client computer side generally has better communications capability, and thus the server computer is required to have faster access speed, i.e., better response capability, with respect to its storage apparatus.

Especially with a computer system using a plurality of server computers those sharing a storage apparatus, an access congestion (concentration) is often observed from the server computers to the storage apparatus, thereby causing the system capability to be deteriorated.

To deal with such an access congestion, Patent Document 1 (JP-A-2003-345709) discloses the following technology. That is, specifically in a case of using a plurality of cache servers, the technology is of the cache servers each freely reducing the traffic flow with their common file server using as a cue a communications congestion occurring between the cache servers and the file server.

SUMMARY OF THE INVENTION

If such a technology of Patent Document 1 is applied to the computer system of the above type in which a plurality of servers share the same storage apparatus, the servers may each freely delay accessing the storage apparatus if an access congestion thereto occurs.

The problem here is that the access speed is also delayed without exception by the servers no matter if a specific client wants to make access to any prioritized file for data reading or writing thereto/therefrom. Assuming here is the case where the servers offer each different service to their corresponding clients, e.g., one server offers service to the clients asking for batch job access, and the other server offers service to the clients asking for online job access. In such a case, if any congestion occurs with the storage apparatus, bandwidth control is exercised over both of the servers to the same degree, resulting in delay in the online job.

To solve such problems, an embodiment of the present invention has the following structure. That is, a plurality of server computers those sharing a storage apparatus each assign priorities to any incoming access requests. Such priority assignment is made based on the attribute of a client computer asking for access. The server computers each add up the priority values of the access requests addressed to itself, and then compare with other add-up values derived by other server computers. Through comparison as such, the server computers each determine an input/output bandwidth for the storage apparatus for use as a basis to make access to the storage apparatus.

DESCRIPTION OF THE PREFERRED EMBODIMENTS

In the below, a first embodiment of a computer system is described in detail by referring to the accompanying drawings.

Figure 1:
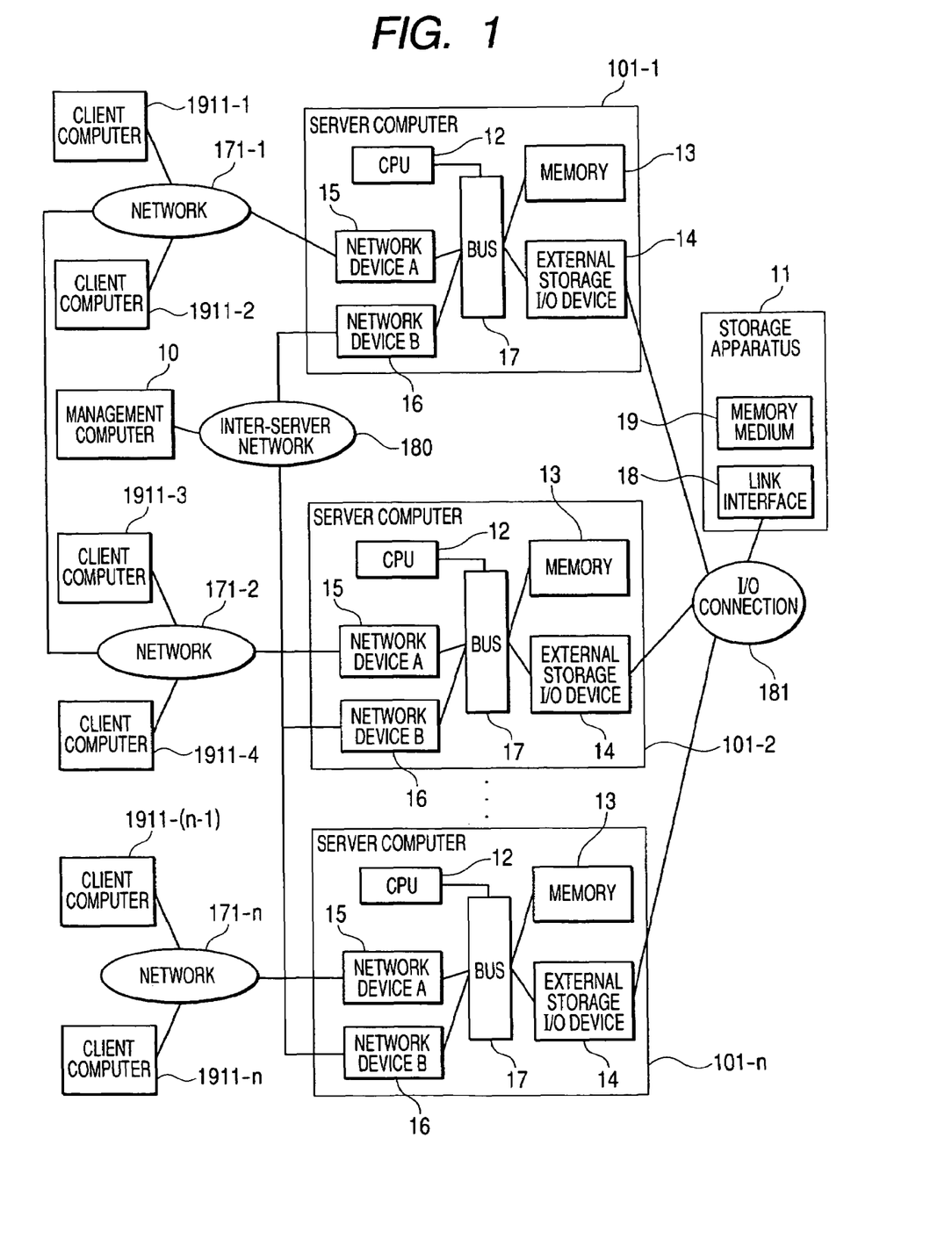
FIG. 1 is a diagram showing an exemplary hardware structure of a computer system of a first embodiment.

FIG. 1 is a diagram showing an exemplary hardware structure of a computer system of the first embodiment.

The computer system includes n server computers 101, a storage apparatus 11 for sharing among the server computers $101_1$ to $101_n$, an I/O (Input/Output) connection 181 for connection between the server computers $101_1$ to $101_n$ and the storage apparatus 11, a network 180 for connection among the server computers $101_1$ to $101_n$ (hereinafter, referred to as "inter-server network 180", and a management computer 10 for setting of the server computers $101_1$ to $101_n$. Such a computer system is connected, over networks $171_1$ to $171_n$, to a plurality of client computers $1911_1$ to $1911_n$ those making file access requests to the server computers $101_1$ to $101_n$. Alternatively, the networks $171_1$ to $171_n$ may be connected to one another, and in FIG. 1 example, a connection is established between the networks $171_1$ and $171_2$. Or the networks $171_1$ to $171_n$ may be provided as a single network. The server computers $101_1$ to $101_n$ may each be a blade computer provided on a single substrate, and if so, those may be all placed in a cabinet.

The server computer 101 includes a CPU (Central Processing Unit) 12, a main storage apparatus (memory) 13, network devices A15 and B16, and an external storage I/O device 14, those of which are connected to one another over a bus 17 or others. The client computer 1911 is general in type, and includes a CPU, memory, and a network connector for communications.

The management computer 10 is provided for setting of various parameters for the server computers 101$_1$ to 101$_n$.

The storage apparatus 11 includes a connection interface 18 for connection with the I/O connection 181, a memory medium 19, and a control section for exercising control over data input and output to/from the memory medium. The memory medium here is of a nonvolatile memory medium including hard disk drives, flash memories, or others. Alternatively, the storage apparatus 11 may be a disk array apparatus including a plurality of hard disk drives. The disk array apparatus may be of the RAID structure.

The I/O connection 181 is a communications line generally including SCSI (Small Computer Systems Interface), FC (Fibre Channel), iSCSI (internet SCSI), or others.

Figure 2:
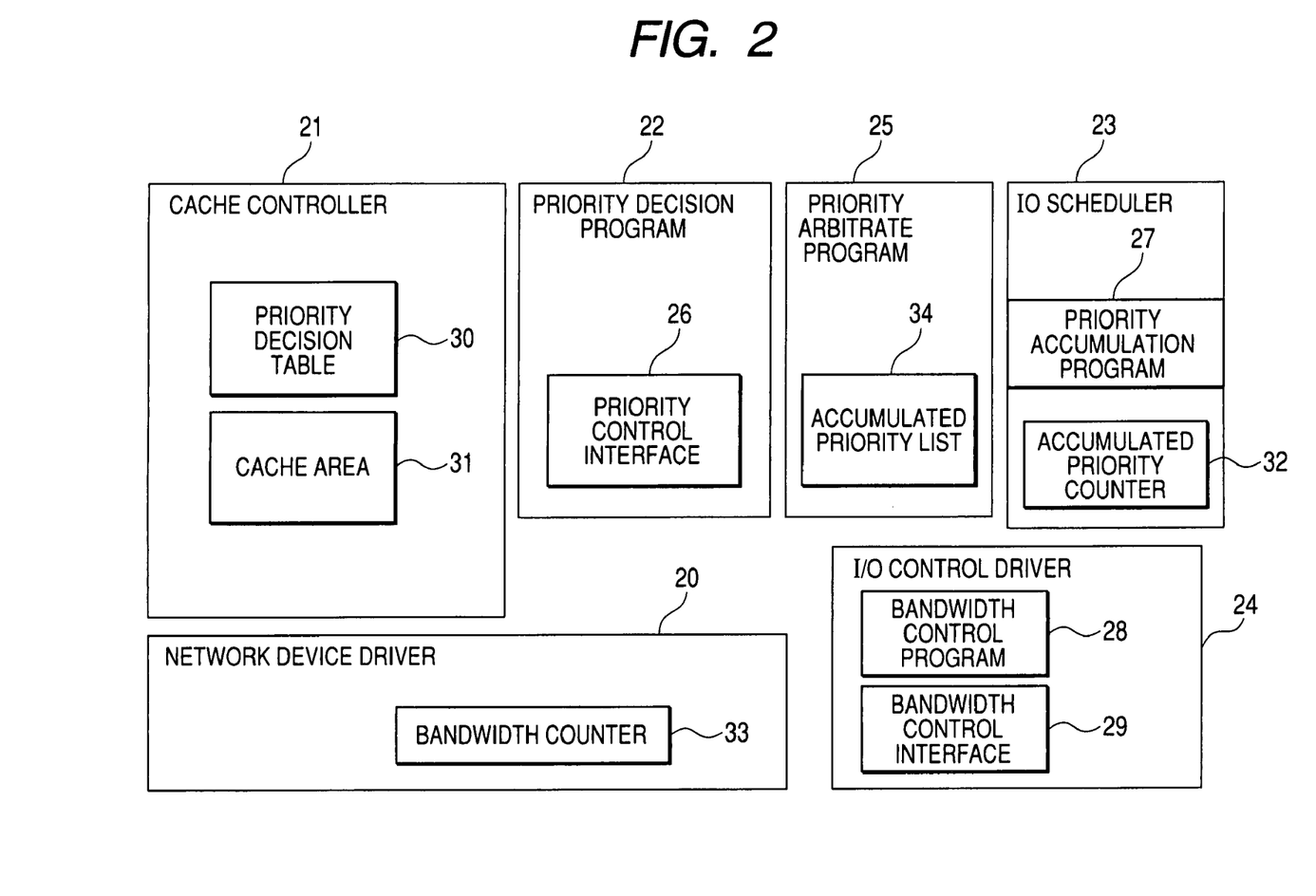
FIG. 2 is a diagram showing an exemplary structure of a program for storage into memory 13.

FIG. 2 is a diagram showing an exemplary structure of a program or others for storage into the memory 13.

As shown in FIG. 2, the memory 13 stores various programs, including a network device driver 20, a cache controller 21, a priority decision program 22, IO (Input/Output) scheduler 23, an I/O control driver 24, and a priority arbitrate program 25. The priority decision program 22 includes a priority control interface 26, a priority decision table 30, and a cache area 31. Herein, the priority control interface 26 is a software interface, and in the below, referred also to as "application interface (API)". The IO scheduler 23 includes a priority accumulation program 27, and an accumulated priority counter 32. The I/O control driver 24 includes a bandwidth control program 28, a bandwidth control interface 29, and a bandwidth counter 33. The priority arbitrate program 25 includes an accumulated priority list 34.

In the above, the network device driver 20 is a driver program to be executed by the CPU 12 for exercising control over communications in the network devices A15 and B16. The cache controller 21 is a program to be executed by the CPU 12 for managing the cache area 31. Through execution of such a program, the CPU 12 keeps track of information about previous access responses, e.g., whether the cache area 31 carries data, thereby enabling quick response with respect to access requests coming from the client computers 1911. Here, such a process may have the same principle as the process in a file cache for use in a general operating system.

Through execution of the priority decision program 22, the CPU 12 analyzes the IP (Internet Protocol) address of the client computer 1911 from which access requests come, and the details of the access requests. The CPU 12 then assigns priorities to the access requests by referring to the priority decision table 30 for information about the client computer. The information includes the attribute of the client computer, and the priority given to the attribute. Herein, the contents of the priority decision table 30 are user changeable by making a setting from the management computer 10 using the priority control interface 26.

The resulting priority-assigned access requests derived by executing the priority decision program 22 are then stored in the memory 13 by the CPU 12 executing the IO scheduler 23 and the I/O control driver 24 this time. The priorities assigned to the access requests are used as a basis for transmission to the storage apparatus 11. To be more specific, for example, the CPU 12 forms the queue structure in the memory 13, and inserts the access requests in order of priority to the queue structure for sorting. In the sorted order, the access requests are to be output.

The CPU 12 executes the priority accumulation program 27 to scan the access requests accumulated in the memory 13 at established time intervals. Then, the priorities of the access requests are totalized for reflection to the accumulated priority counter 32.

At the time of data input/output to/from the storage apparatus 11 through execution of the I/O control driver 24, the CPU 12 uses the bandwidth counter 33 and the bandwidth control program 28 to exercise control over the bandwidth for use with the storage apparatus 11 for data input/output. For value setting of the bandwidth counter 33, the CPU 12 uses the bandwidth control interface 29.

Figure 3:
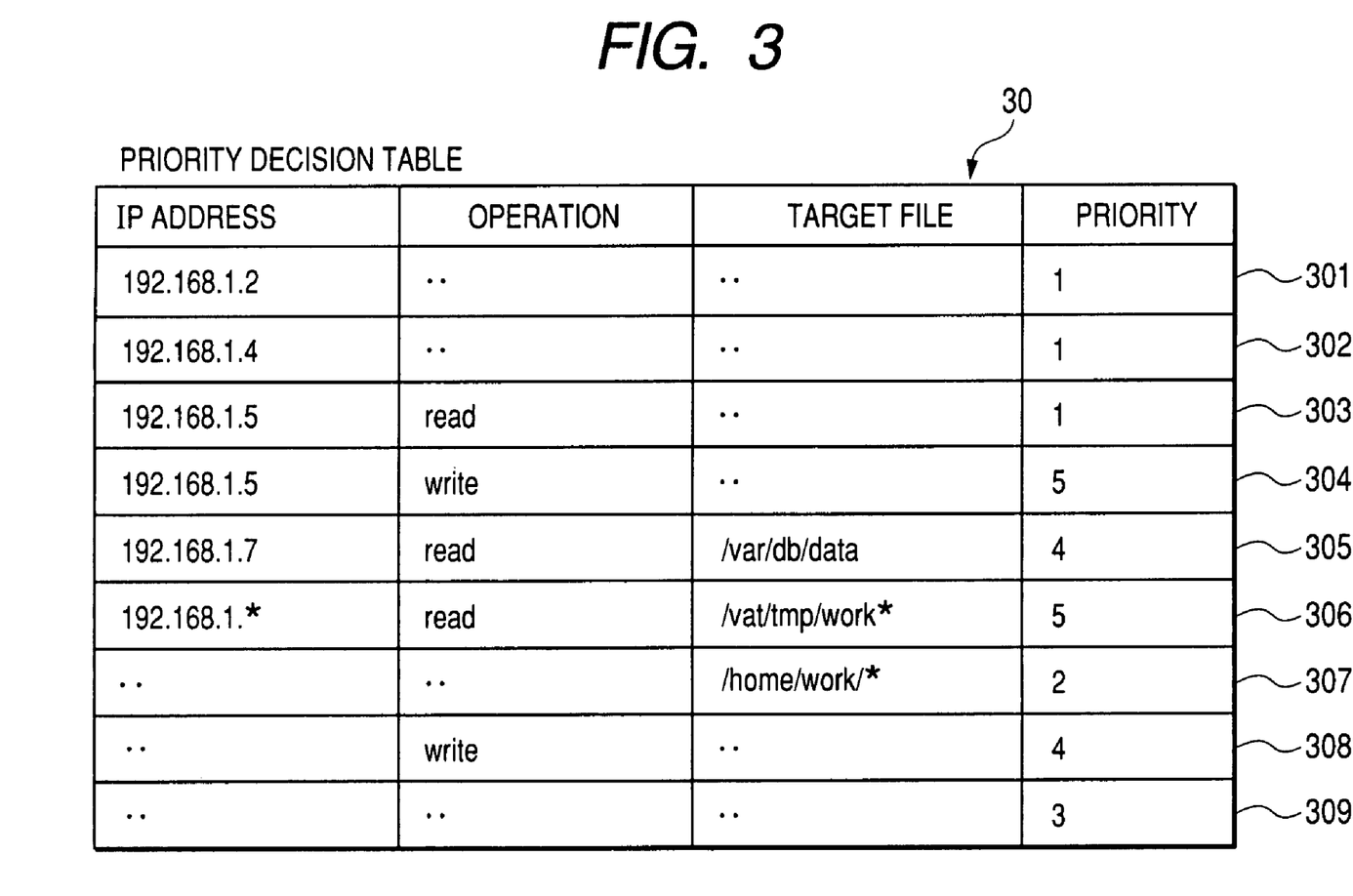
FIG. 3 is a diagram showing an exemplary structure of a priority decision table 30.

FIG. 3 is a diagram showing an exemplary structure of the priority decision table 30, which stores information about correspondence between the attribute of the client computer, and the priority. The priority decision table 30 stores an arbitrary number of pairs of the attribute of the client computer, and the priority of the access request coming from the client computer. Herein, the attribute of the client computer includes the IP address of the client computer 1911, specific job details of the access request (in the below, referred also to as "operation"), and a target file of the access request.

Based on the contents stored in the priority decision table 30, the CPU 12 performs priority assignment to every incoming access request. Such priority assignment using the priority decision table 30 varies in manner. Exemplified are cases where any access request coming from a specific client computer 1911, e.g., a client computer 1911 asking for a real-time job, may all be set high in priority, only data writing requests coming from a specific client computer 1911 may be set high in priority, or any data reading requests for a specific file or directory stored in the storage apparatus may be set high in priority. A system administrator or others in charge makes a priority setting for the priority decision table 30 considering how the computer system is used with what usage policy.

As to the priorities described above, FIG. 3 shows exemplary contents as below. In the below, presumably, the larger value in the priority column means the higher priority.

As to a setting made for rows 301 and 302, all requests coming from the client computer 1911 having the IP address of 192.168.1.2, and all requests coming from the client computer 1911 having the IP address of 192.168.1.4 are always assigned with a priority value of 1 (low priority).

As to a setting made for rows 303 and 304, all reading requests coming from the client computer 1911 having the IP address of 192.168.1.5 are assigned with a priority value of 1, but writing requests coming therefrom are assigned with a higher priority value of 5. With such a setting, data writing takes higher priority over data reading.

As to a setting made for a row 305, to any reading requests coming from the client computers 1911 having the IP address of 192.168.1.7, a priority value of 4 is assigned if they are asking for data reading from a file "/var/db/data".

As to a setting made for a row 306, to any access requests coming from the client computer 1911 having the P address of 192.168.1.xxx (where xxx denotes 1 to 254), a priority value of 5 is assigned if they are asking for data reading from a file named with the string "/var/tmp/work*" at the head.

As to a setting made for a row 307, to any access requests from the client computer(s) 1911 not applicable to the above settings, a priority value of 2 is assigned if they are asking for accessing a file named with the string "/home/work/*".

Moreover, as to a setting made for a row 308, any writing access requests not coming from the client computers 1911 those defined by the rows 301 to 307 are all assigned with a priority value of 4.

As to a setting made for a row 309, any access requests not coming from the client computers 1911 defined by the rows 301 to 308 are assigned with a priority value of 3. Here, the value 3 is a default value, and to any access requests those regarded as not necessarily assigned with a priority, or those not yet regarded as targets for priority assignment are all assigned with the priority value of 3 (intermediate priority). This default value is not surely restricted to 3, and may be 0 of the lowest priority.

In the above, the server computers $101_1$ to $101_n$ may be connected to each different client computers, and thus the priority decision table 30 may carry each different information on a server computer basis. This minimizes the number of client computers 1911 to be entered in the priority decision table 30, whereby the time taken to check the priority decision table 30 can be favorably shortened.

In a case where the networks $171_1$ to $171_n$ connecting the server computers $101_1$ to $101_n$ are connected to each other, the server computers $101_1$ to $101_n$ may carry the same priority decision table 30. If this is the case, the server computers $101_1$ to $101_n$ can perform priority assignment in a consistent manner, i.e., same priority value to the same access request. The administrator of the computer system may take charge of setting, collectively, the contents of the priority decision table 30 for each of the server computers 101 through the management computer 10 or over the networks 171.

Figure 4:
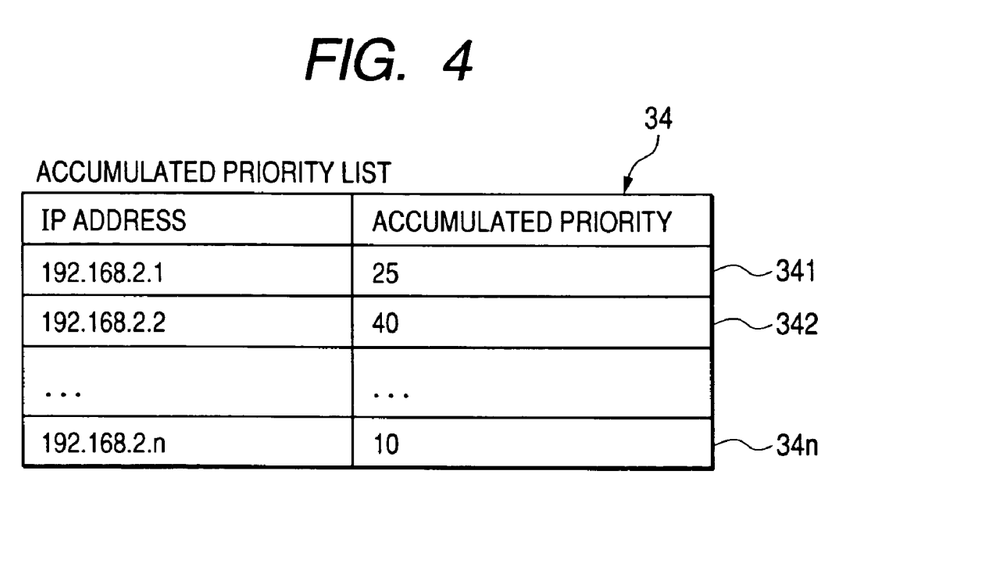
FIG. 4 is a diagram showing an exemplary structure of an accumulated priority list 34.

FIG. 4 is a diagram showing an exemplary structure of the accumulated priority list 34, which stores pairs of an IP address and a priority add-up value. Specifically, the IP address is the one assigned to each of the server computers $101_1$ to $101_n$ in the computer system. The priority add-up value is information about the priorities of access requests calculated by each of the server computers 101 and passed thereamong, i.e., a value derived by adding every priority value assigned to the access requests stored in each of the server computers 101. In the below, such a priority add-up value is referred to as an accumulated priority.

The server computers 101 each enter, to the accumulated priority list 34, the information about the accumulated priority collected from other server computers 101. Then, by calculating the ratio of their own accumulated priority to those in total in the accumulated priority list 34, the server computers 101 each set, as their own bandwidth, the bandwidth of the calculated ratio out of the entire bandwidth among the storage apparatus 11 and the server computers $101_1$ to $101_n$. That is, if the priority add-up value of its access requests is larger than those of other server computers 101, the server computer 101 is so set as to use more bandwidth than other server computers 101.

Figure 5:
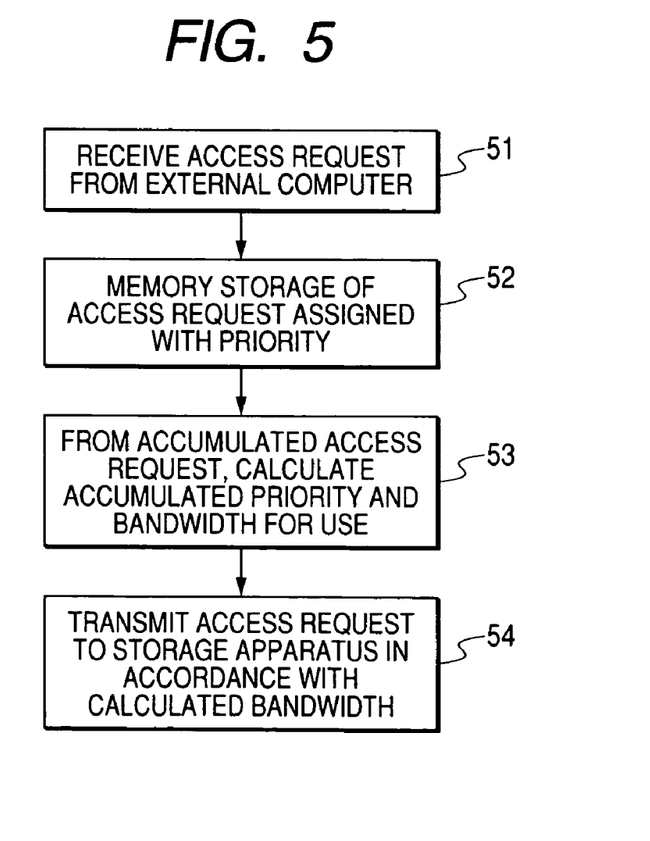
FIG. 5 is a flowchart roughly showing the process procedure until a CPU 12 executes an access request received from a client.

By referring to FIG. 5, described is the rough flow of an access request process by exemplifying the server $101_1$.

The server computer $101_1$ first receives an access request coming from the client computer 1911 (step 51), and then assigns a priority to the received access request for storage into the memory 13 (step 52). The server computer $101_1$ then refers to the access requests so far stored in itself to add up their priorities. Using thus derived accumulated priority and other accumulated priorities coming from other server computers $101_2$ to $101_n$, the server 101_1 calculates a bandwidth for its use (step 53), and then goes through the access request process based on the calculated bandwidth (step 54).

Figure 6:
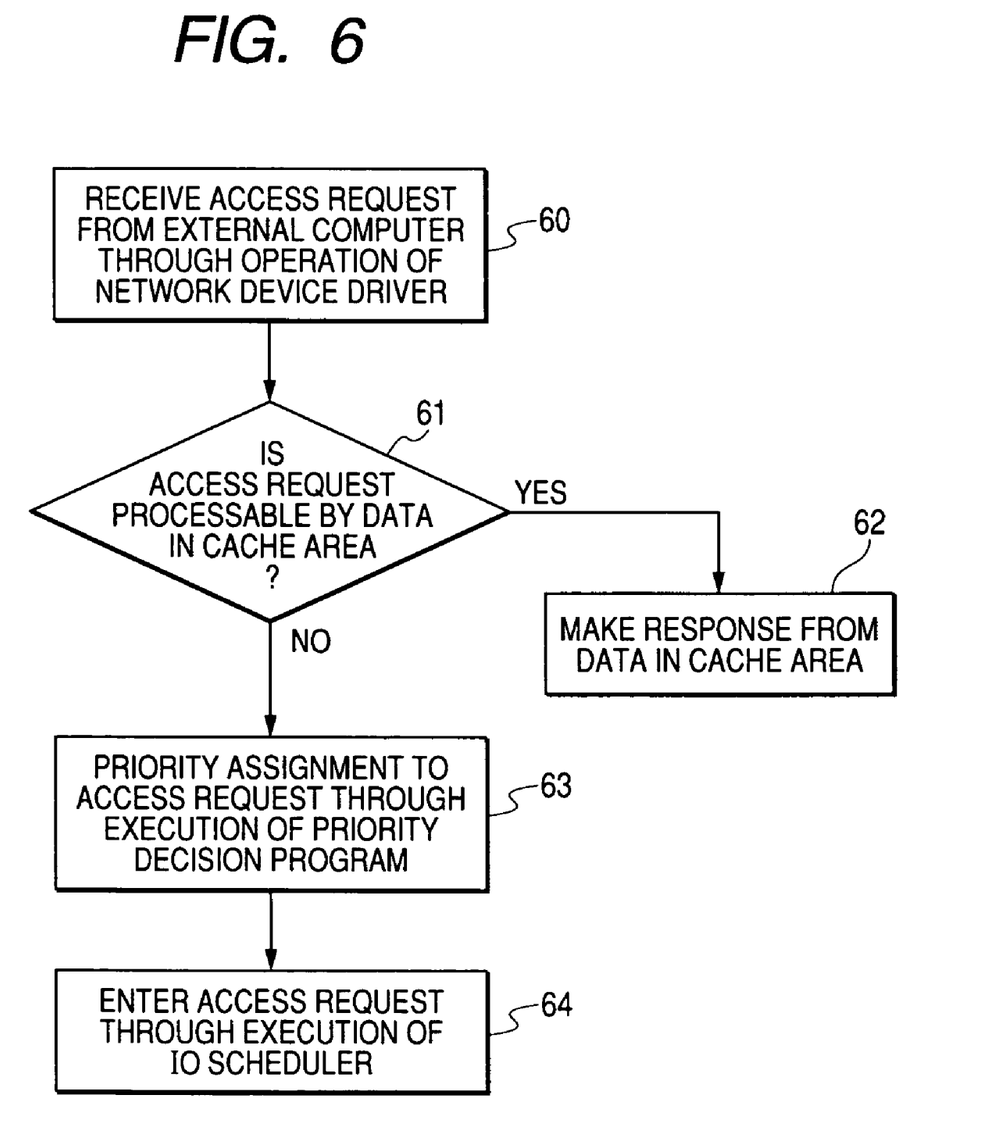
FIG. 6 is a flowchart showing an exemplary process procedure until the CPU 12 stores the received access request into the memory 13 after assigning a priority thereto.
Figure 7:
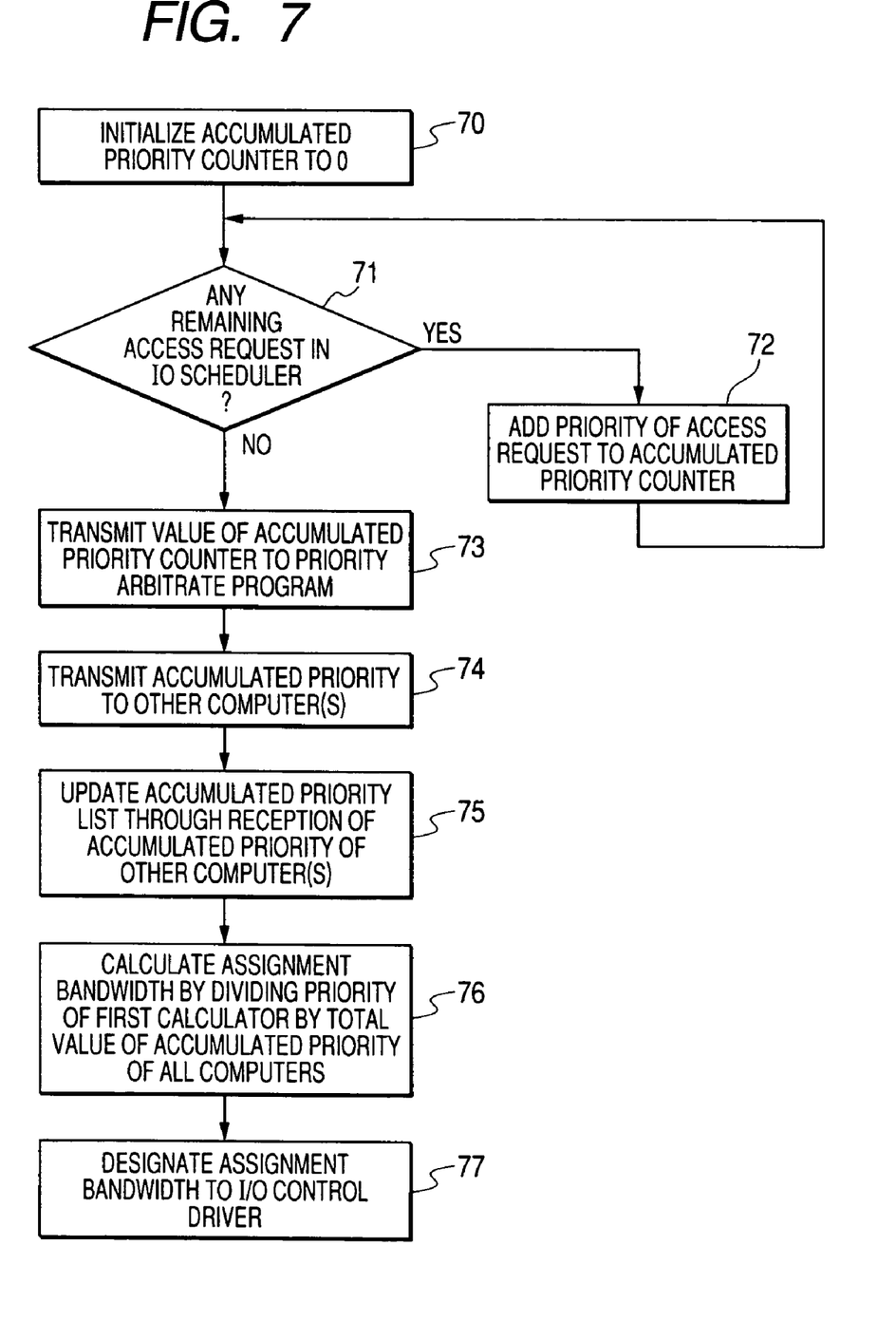
FIG. 7 is a flowchart showing an exemplary process procedure until the CPU 12 calculates an accumulated priority value from an accumulation of access requests and a bandwidth for its use.
Figure 8:
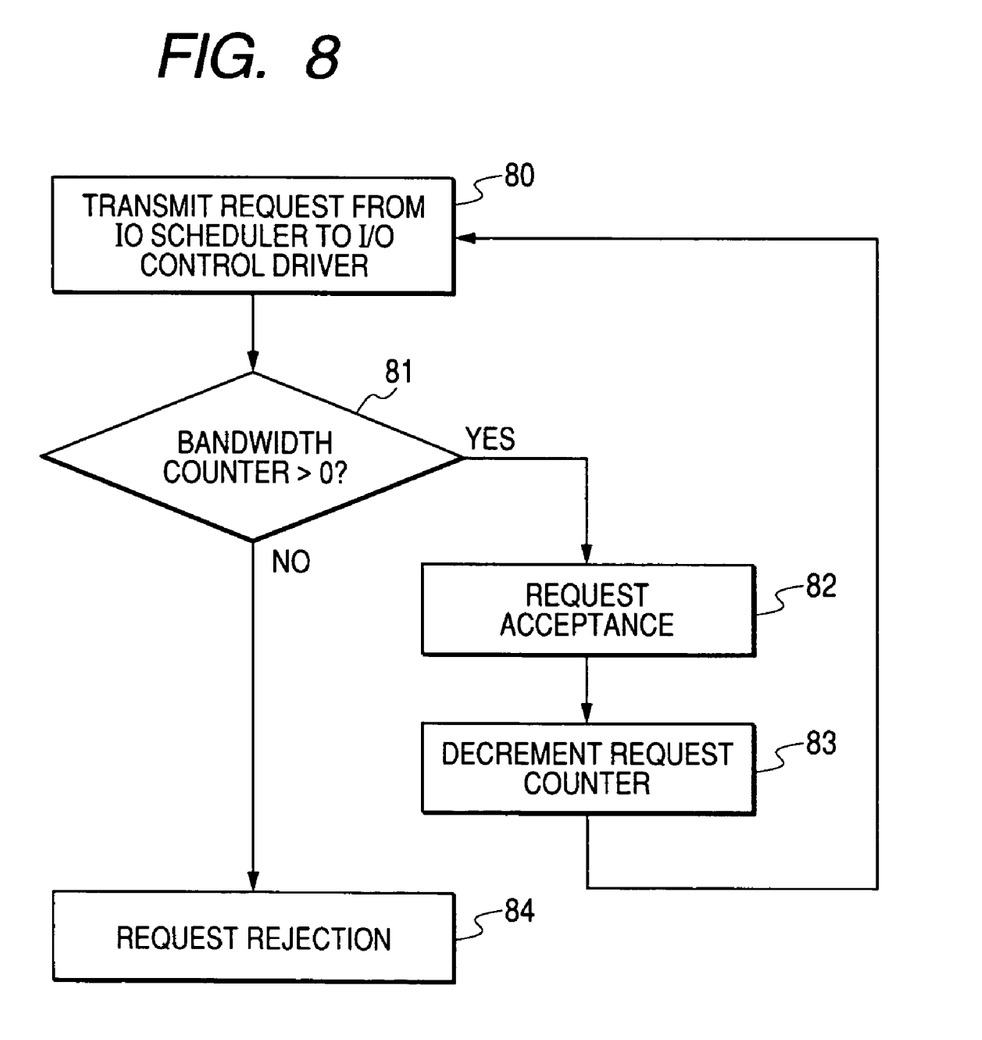
FIG. 8 is a flowchart showing an exemplary procedure for the CPU 12 to forward an access request to a storage apparatus 11 based on the calculated bandwidth.

By referring to FIGS. 6 to 8, the process details are described now on a step basis.

First by referring to the flowchart of FIG. 6, described is the process until the access request forwarded to the server computer $101_1$ is stored in the memory 13 by the CPU 12 executing the IO scheduler 23.

First of all, the access request coming to the server computer $101_1$ from the client computer $1911_1$ over the network $171_1$ and the network device A15 is received by the CPU 12 through execution of the network device driver 20 (step 60).

After receiving the access request, the CPU 12 goes through the cache controller 21 to determine whether the access request is processable by using only data stored in the cache area 31. If determined as processable, the CPU 12 makes a response to the client computer $1911_1$ after going through a process, i.e., data reading or writing from/to the cache area 31 (steps 61 and 62).

If determined that the access request is not processable by using data in the cache area 31, on the other hand, the CPU 12 goes through the priority decision program 22 to assign a priority to the access request (step 63). Such priority assignment process will be described below by referring to FIG. 9.

After performing priority assignment as such, the CPU 12 goes through the IO scheduler 23 to enter the priority-assigned access request to the memory 13. For entry, the queue structure or others is used as described above (step 64).

By referring to the flowchart of FIG. 7, described next is the process procedure for the server computer $101_1$ to calculate a bandwidth for its use, and forward the access request stored in the memory 13 to the storage apparatus 11 using the calculated bandwidth.

The CPU 12 of the server computer $101_1$ starts executing the priority accumulation program 27 so that the accumulated priority counter 32 is initialized to 0. Here, basically, the CPU 12 executes the priority accumulation program 27 at established time intervals (step 70). Alternatively, the priority accumulation program 27 may be executed after storage of the access requests is almost completed in the memory 13, or when the server computer 101 becomes not capable enough for a predetermined performance.

If the memory 13 has any access request not yet assigned with a priority, the CPU 12 then adds the priority to the accumulated priority counter 32 (steps 71 and 72).

Next, the CPU 12 goes through the priority arbitrate program 25 to enter the value thus added to the accumulated priority counter 32 to the accumulated priority list 34 as the accumulated priority of the server computer $101_1$, i.e., of its own (step 73).

Still through execution of the priority arbitrate program 25, the CPU 12 then forwards the information about its own accumulated priority to the server computers $101_2$ to $101_n$ through the network device B16 (step 74).

Still through execution of the priority arbitrate program 25, the CPU 12 receives the value of the accumulated priority coming from other server computers $101_2$ to $101_n$ through the network device B16 to update the contents of the accumulated priority list 34 (step 75). Note here that steps 74 and 75 may be executed at the same time.

In the present embodiment, the server computers $101_1$ to $101_n$ have the same timer, and thereamong, information about their accumulated priorities are coming and going at the same time. As an alternative structure, when receiving an accumulated priority coming from any other server computers 101, the server computer 101 may responsively forward back its accumulated priority. In such a case, to stop endless receiving and forwarding the accumulated priority, when forwarding back its accumulated priority, the server computer 101 also forwards information telling that it is a reply. The server computer 101 received such information interprets that the incoming accumulated priority is a reply with respect to its own transmission, and stops forwarding its accumulated priority again.

Using the values entered in the accumulated priority list 34, the CPU 12 calculates a bandwidth for its use with the storage apparatus 11 (step 76). For calculation, the CPU 12 divides the accumulated priority of the server 11, by the add-up value of the accumulated priorities of the server computers $101_1$ to $101_n$, and then multiplies the add-up value by the value of entire bandwidths available for the storage apparatus 11. In such a manner, the resulting bandwidth becomes proportional to the accumulated priorities relative among the server computers $101_1$ to $101_n$.

Thereafter, the CPU 12 designates the calculated value for the bandwidth to the bandwidth counter 33 through the bandwidth control interface 29 (step 77). This allows the server computers $101_1$ to $101_n$ to control their own bandwidth for use with the storage apparatus.

By referring to the flowchart of FIG. 8, described next is an exemplary procedure in which the CPU 12 of the server computer $101_1$ executes the IO scheduler 23 to transmit the access requests stored in the memory 13 to the storage apparatus 11.

The CPU 12 executes the IO scheduler 23 to be ready to transmit the access requests stored in the memory 13 to the storage apparatus 11 in order of priority (step 80).

At this time, the CPU 12 goes through the I/O control driver 24 to determine if this is a time for access request transmission. To be specific, the CPU 12 checks the value of the bandwidth counter 33 to see whether there is any bandwidth left for its own use. Here, as described in the foregoing, the bandwidth counter 33 stores the calculated value of the bandwidth available for the CPU 12. Every time the access request comes to the storage apparatus 11, the counter value is decremented. That is, communications exceeding any available bandwidth makes the value of the bandwidth counter 33 negative. Accordingly, when the bandwidth counter has the value of 0, the server computer 101 suspends the communications for a given time so as not to allow communications exceeding the bandwidth available therefor. If the bandwidth counter 33 is not showing 0, the CPU 12 executes the I/O control driver 24 to transmit the access request to the storage apparatus 11, thereby decrementing the value of the bandwidth counter 33 (steps 81, 82, and 83).

On the other hand, when the value of the bandwidth counter 33 is 0, the CPU 12 suspends access request transmission that is now ready through execution of the IO scheduler 23 (step 84). Thus transmission-suspended access requests are entered again in the IO scheduler 23 for storage into the memory 13.

Here, the transmission-suspended access requests are transmitted after the value setting of the bandwidth counter 33 is completed. The value of the bandwidth counter 33 is put back to the first-designated value for every second, e.g., if the first-designated value is 10 Mbps, the value appears again. Thus suspended access requests are transmitted after the value of the bandwidth counter 33 is put back as such. Herein, if the bandwidth calculation is made again in response to the recalculation of the priority, the initially-designated value of the bandwidth counter 33 itself is changed, and then the counter 33 is set by the value changed on a second basis.

Figure 9:
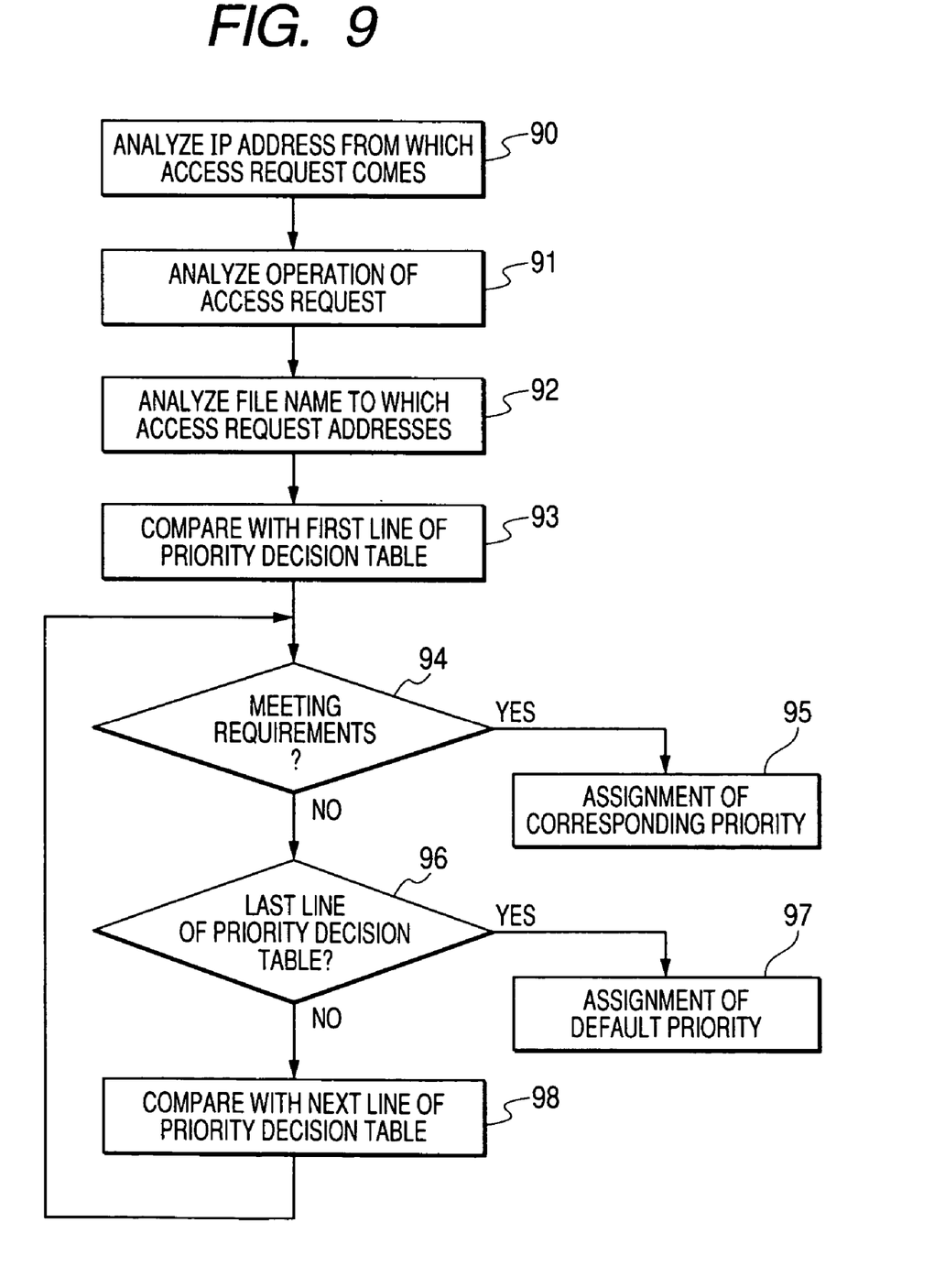
FIG. 9 is a flowchart showing an exemplary procedure for the CPU 12 to assign priorities to access requests.

By referring to the flowchart of FIG. 9, described next is the specific procedure of priority assignment to access requests by the CPU 12 executing the priority decision program 22.

First, when an access request comes, the CPU 12 analyzes the IP address of the client computer from which the access request comes. The CPU 12 checks the priority decision table 30 to see whether the IP address in the access request is found therein (step 90).

If found, the CPU 12 performs analyses as follows.
1. Operation analysis of the access request (step 91).
2. Analysis of access-requested file name (step 92).

After these analyses are through, based on the analysis result, the CPU 12 searches the priority decision table 30 for any entry matching the analysis result. Specifically, the CPU 12 first compares the first line (entry) of the priority decision table 30 and the analysis details of the received access request (step 93). If the IP address/operation/file name meets the requirements, the priority corresponding to the entry is assigned to the access request (steps 94 and 95).

If the requirements are not met, the CPU 12 checks if it is the last line of the priority decision table 30 (step 96). If it is not the last line, the CPU 12 performs comparison with the requirements for the line (step 98). If there is no matching, the CPU 12 assigns the access request with a default priority set to the last line of the priority decision table 30 (step 97).

In the above-described manner, the server computers 101 of the first embodiment become able to exercise appropriate control over the input/output bandwidth for the storage apparatus 11 among the server computers 101, and secure the access response time in consideration of the properties of the client computers 1911. For achievements as such, the server computers 101 classify the access requests coming from the client computers 1911 by priority based on the attributes of the client computers 1911, and thus derived priority information is exchanged among the server computers 101.

In the above first embodiment, instead of using the network device B16 of the computer 101 and the inter-server network 180, a single network as a result of coupling together the networks $171_1$ to $171_n$, and the network device A15 may be used for transmission and reception of the accumulated priorities. This structure eliminates the need for the network device B16 in the respective server computers 101.

Further, in the above first embodiment, as alternatives to the network device B16 of the computer 101 and the inter-server network 180, the external storage I/O device 14 and the I/O connection 181 may be used for transmission and reception of the accumulated priorities. This structure also eliminates the need for the network device B16 in the respective server computers 101.

Still further, in the above first embodiment, for transmission and reception of the accumulated priority, instead of using the network device B16 of the computer 101 and the inter-server network 180, the accumulated priority list 34 may be stored in a predetermined area of the storage apparatus 11 to be accessible for the server computers 101 via the external storage I/O device 14 for information sharing. This structure also eliminates the need for the network device B16 in the respective server computers 101.

The processes in the above first embodiment are able to be structured as processing programs. Such processing programs can be provided in memory media exemplified by HD, DAT, FD, MO, DVD-RAM, CD-ROM, or others, or provided over the network. The processing programs are also designed to supplant with any specific hardware for incorporation.

Figure 10:
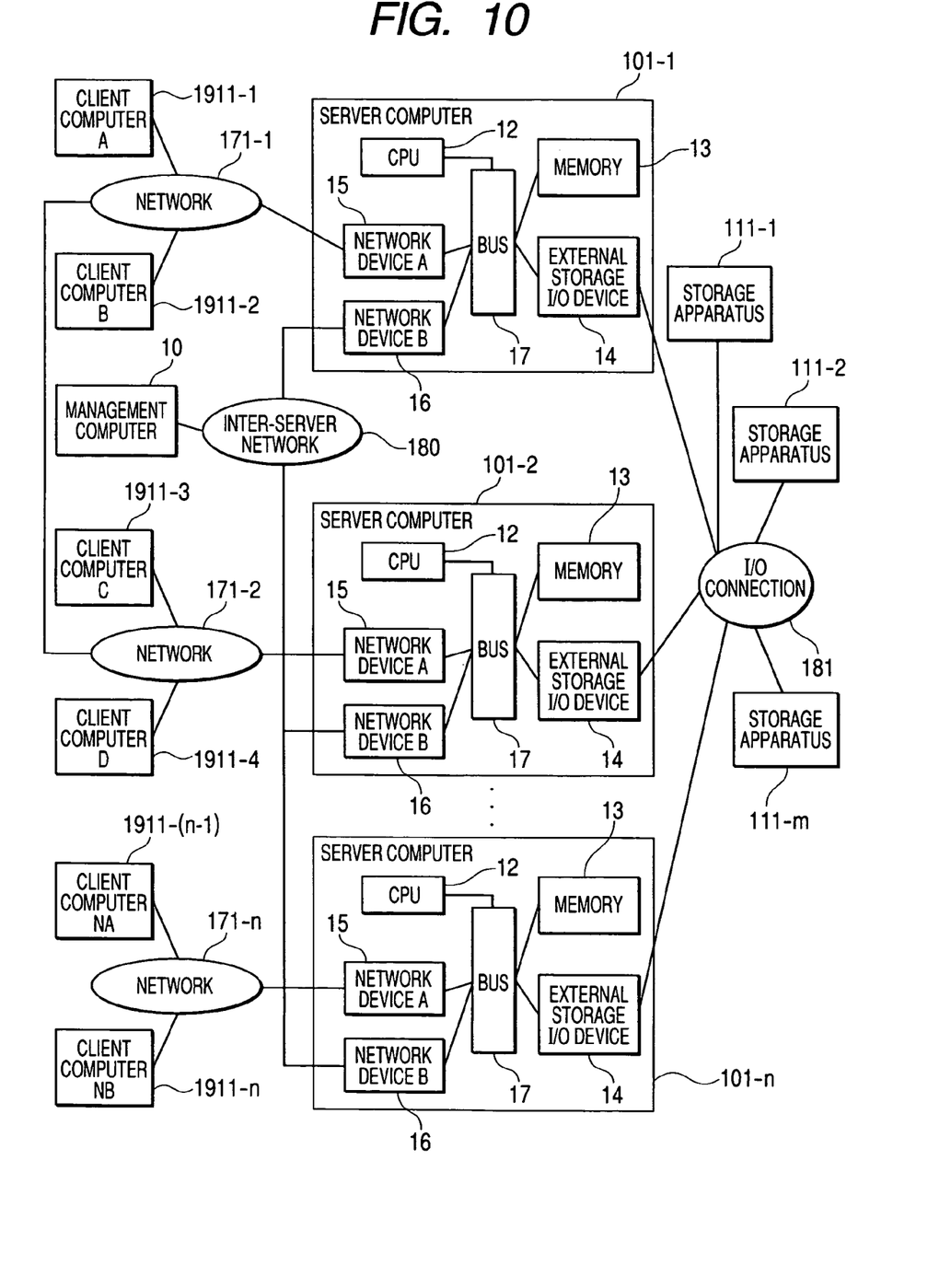
FIG. 10 is a diagram showing an exemplary hardware structure of a computer system of a second embodiment.

FIG. 10 is a diagram showing an exemplary hardware structure of a computer system of a second embodiment. In the second embodiment of FIG. 10, the storage apparatus 11 of the first embodiment is replaced with a plurality of storage apparatuses 111.

The storage apparatuses 111 are connected to each corresponding server computer 101 through the same I/O connection 181. The server computers 101 exercise bandwidth control over the I/O connection 181 so that the accumulated priority list 34 of the first embodiment can be used without any change.

This is because the bandwidths for data input/output are combined together by the I/O connection 181 even if the storage apparatus is plurally provided. Thus, the server computers become able to perform bandwidth calculation in a similar manner to the first embodiment. On the other hand, in a case where the I/O connection 181 is provided for every server computer, the server computers 101 need to perform bandwidth calculation for every I/O connection 181.

According to the second embodiment, provided is a computer system capable of handling a plurality of storage apparatuses 111 at the same time, and the larger number of storage apparatuses successfully leads to the storage capacity increase in the computer system.

Figure 11:
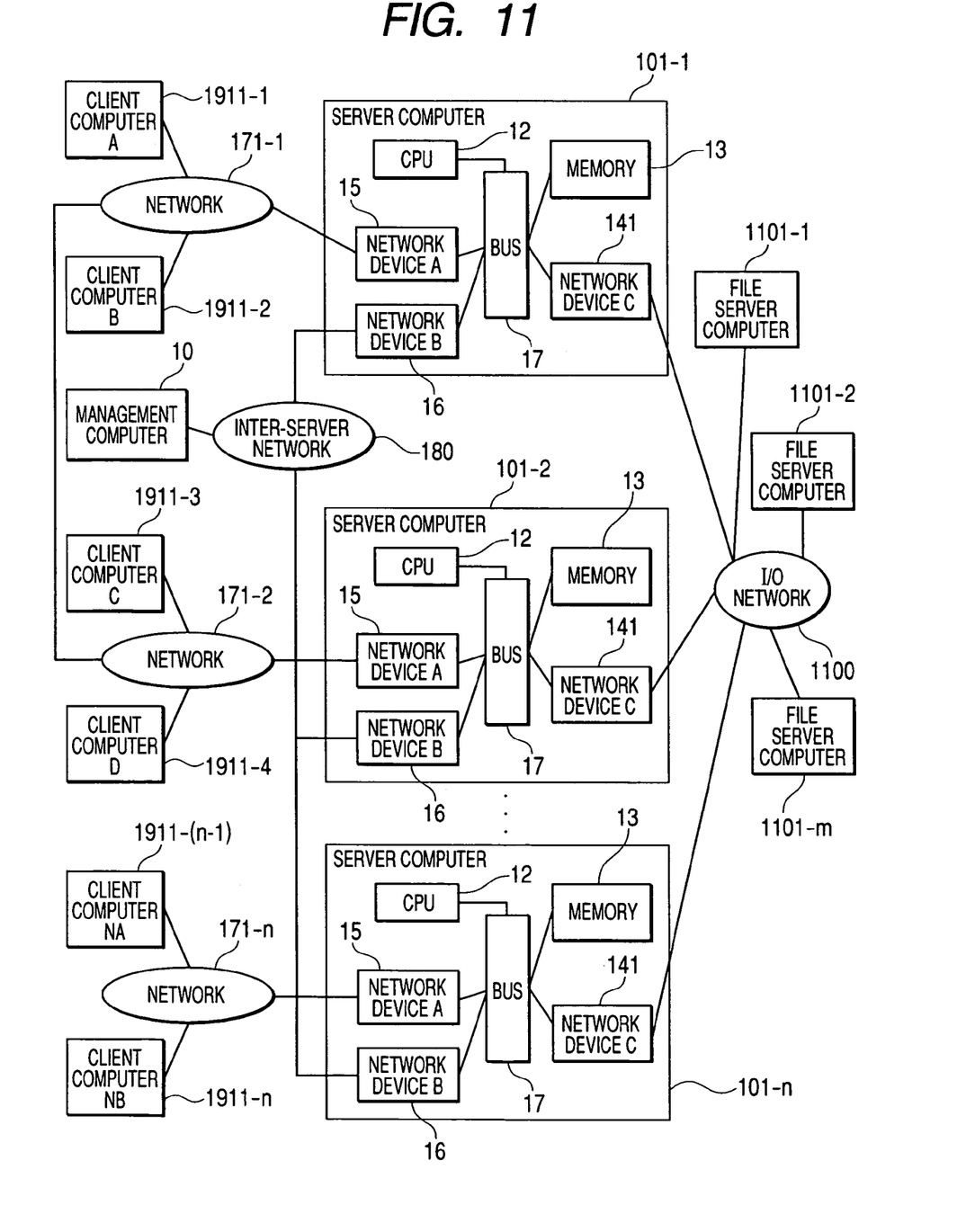
FIG. 11 is a diagram showing an exemplary hardware structure of a computer system of a third embodiment.

FIG. 11 is a diagram showing an exemplary hardware structure of a computer system of a third embodiment. In the third embodiment of FIG. 11, the storage apparatus 111 of the second embodiment is replaced with a file server computer 1101, and the external storage I/O device 14 with a network device C141, and the I/O connection 181 with an I/O network 1100. Here, the file server computer 1101 may be a storage apparatus that is connected over the network for handling file data, i.e., network attached storage (NAS).

According to the third embodiment, without including the storage apparatus 11 and the I/O connection 181 for sharing among a plurality of computers, the similar effects as the second embodiment can be favorably achieved by using only the network device C141 of a general type and the I/O network 1100.

In the third embodiment, for establishing a connection from the server computer 101 to the file server computer 1101, an I/O network 1100 is used as an alternative to the I/O connection 181. Moreover, the information about the accumulated priority is forwarded from any specific computer 101 to any other computer 101 via the network device C141 instead of the network device B16 over the I/O network 1100 instead of the inter-server network 180. With such a structure, the resulting computer system does not need to include the network device B16 and the inter-server network 180. Further, with the computer system, I/O control can be exercised not only on the memory medium 19 basis but on a file basis. This allows the server computers 101 to share the same file system.

According to the present invention, bandwidth control can be so exercised as not to cause job delay for any high-priority access requests coming from each different server computers. With such a specific setting that the batch job is set low in priority, and the online job is set high in priority, no delay occurs to the online job. Moreover, by setting any writing requests high in priority, no delay occurs to data update for sharing among other client computers. Accordingly, no delay occurs for data use in other client computers.

What we claim:

1. A bandwidth control method in a computer system including a plurality of computers that share a storage apparatus, comprising the steps of:
assigning, by a first computer of the plurality of computers, priorities to access requests received from a client computer connected to the computer system, the priorities being based on an attribute of the client computer;
determining a bandwidth for use with the storage apparatus through an exchange of information about the priorities with a rest of the plurality of computers;
transmitting each of the access requests to the storage apparatus based on the determined bandwidth,
wherein the step of determining the bandwidth includes deriving an accumulated priority value by adding the priorities assigned to the received access requests and exchanging the accumulated priority value of the first computer with accumulated priority values derived by the rest of the plurality of computers;
calculating, by the first computer, a ratio of the accumulated priority value for the first computer to a total accumulated priority value derived by adding the accumulated priority value for the first computer to the accumulated priority values of the rest of the plurality of computers; and
determining the bandwidth for use with the storage apparatus in accordance with the ratio.

2. A bandwidth control method according to claim 1, wherein priority is determined based on information specifically about the attribute of the client computer.

3. A bandwidth control method according to claim 2, wherein the information specifically about the attribute of the client computer is stored in each of the plurality of computers.

4. A bandwidth control method according to claim 2, wherein the information specifically about the attribute of the client computer is stored in the storage apparatus, and each of the plurality of computers reads the information specifically about the attribute of the client computer from the storage apparatus.

5. A bandwidth control method according to claim 1, wherein the first computer exchanges the information about the priorities with the rest of the computers over a network connecting the plurality of computers.

6. A bandwidth control method according to claim 1, wherein the first computer exchanges the information about the priorities with the rest of the computers via the storage apparatus.

7. A bandwidth control method according to claim 2, wherein the information specifically about the attribute of the client computer includes the information about the priorities corresponding to an IP address of the client computer, an access operation, or an accessing file, and the first computer performs priority assignment based on the information specifically about the attribute of the client computer.

8. A bandwidth control method according to claim 1, wherein the storage apparatus is plurally provided.

9. A bandwidth control method according to claim 1, wherein the storage apparatus is an NAS (Network-Attached Storage).

10. A computer system, comprising:
a first computer;
a second computer connected to the first computer; and
a storage apparatus connected to both the first computer and the second computer,
wherein the first computer and the second computer assign priorities to access requests received from a client computer connected to the first computer, the priorities being based on an attribute of the client computer,
wherein the first computer receives information about the priorities assigned by the second computer,
wherein the first computer determines a bandwidth for use with the storage apparatus by using the received information about the priorities assigned by the second computer and information about the priorities assigned by the first computer,
wherein the first computer transmits the access requests to the storage apparatus based on the determined bandwidth,
wherein the first computer determines bandwidth by deriving an accumulated priority value by adding the priorities assigned to the received access requests, and exchanges the accumulated priority value of the first computer with an accumulated priority value derived by the second computer, and
wherein the first computer determines a total accumulated priority value by adding the accumulated priority value received from the second computer and the accumulated priority value of the first computer, calculates a ratio of the accumulated priority value of the first computer to the total accumulated priority value, and determines the bandwidth for use with the storage apparatus in accordance with the ratio.

11. A computer system according to claim 10, wherein priority is determined based on information specifically about the attribute of the client computer.

12. A computer system according to claim 10, wherein the information specifically about the attribute of the client computer is stored in the storage apparatus, and each of the first computer and the second computer reads the information specifically about the attribute of the client computer from the storage apparatus.

13. A computer system according to claim 10 wherein the first computer exchanges the information about the priorities with the second computer over a network connecting the first computer and the second computer.

14. A computer system according to claim 10,
wherein the information specifically about the attribute of the client computer includes information indicating that when the client computer asks the first computer to execute an online job, an access request relative to the online job is assigned a high priority, and
wherein when the client computer asks the first computer to execute a batch job, an access request relative to the batch job is assigned a low priority.

15. A computer system according to claim 10,
wherein the information specifically about the attribute of the client computer includes information indicating that when the client computer asks the first computer to execute a data reading process, an access request relative to the data reading process is assigned a low priority, and
wherein when the client computer asks the first computer to execute a data writing process, an access request relative to the data writing process is assigned a high priority.

16. A computer, comprising:
a control section;
a first connection section connected to a storage apparatus for sharing among other computers;
a second connection section connected to the other computers;
a third connection section connected to a client computer; and
memory,
wherein the control section assigns priorities to access requests received from the client computer via the third connection section based on specific information, and stores the priorities assigned to the access requests in the memory, receives information about the priorities of the other computers,
wherein the control section, based on the information about the priorities of the other computers and information about the priorities assigned to the access requests stored in the memory, determines a bandwidth for use with the storage apparatus, and based on the determined bandwidth, transmits the access requests to the storage apparatus via the first connection section,
wherein the control section determines the bandwidth by deriving an accumulated priority value for the computer by adding the priorities assigned to the received access requests and exchanging the accumulated priority value with accumulated priority values derived by the other computers,
wherein the control section calculates a ratio of the accumulated priority value for the computer to a total accumulated priority value derived by adding the accumulated priority value for computer to the accumulated priority values of the other computers, and
wherein the control section determines the bandwidth for use with the storage apparatus in accordance with the ratio.

17. A computer, comprising:
a first computer;
a second computer connected to the first computer; and
a storage apparatus connected to both the first computer and the second computer,
wherein the first computer and the second computer assign priorities to access requests received from a client computer connected to the first computer, the priorities being based on information specifically about an attribute of the client computer,
wherein the first computer receives information about the priorities assigned by the second computer, and determines an accumulated priority value by adding the priorities assigned to the received access requests, and exchanges the accumulated priority value of the first computer with an accumulated priority value derived by the second computer,
wherein the first computer determines a total accumulated priority value by adding the accumulated priority value received from the second computer and the accumulated priority value of the first computer, calculates a ratio of the accumulated priority value for the first computer to the total accumulated priority value, and determines the bandwidth for use with the storage apparatus in accordance with the ratio,
wherein based on the determined bandwidth, the first computer transmits the access requests to the storage apparatus,
wherein the information specifically about the attribute of the client computer includes information indicating that when the client computer asks the first computer to execute a data reading process, an access request relative to the data reading process is assigned a low priority,
wherein when the client computer asks the first computer to execute a data writing process, an access request relative to the data writing process is assigned a high priority,
wherein the information specifically about the attribute of the client computer includes information indicating that when the client computer asks the first computer to execute an online job, an access request relative to the online job is assigned a high priority, and
wherein when the client computer asks the first computer to execute a batch job, an access request relative to the batch job is assigned a low priority.

* * * * *